3,212,957
STRIPPABLE WALL COVERING
Frank Raymond Linda, Norwalk, Conn., and John H. Goodwin, White Plains, N.Y., assignors to International Paper Company, New York, N.Y., a corporation of New York
No Drawing. Filed Jan. 10, 1961, Ser. No. 81,690
4 Claims. (Cl. 161—167)

This invention relates to wall coverings. More particularly, it relates to wall coverings of paper, cloth, wood veneer, plastics, etc., which can be readily removed, i.e., stripped, from the walls for replacement by another wall covering in the event of a redecoration or the like. This is a continuation-in-part of copending Serial No. 17,483, filed March 25, 1960, now abandoned.

Heretofore, those having the opportunity of using wall coverings such as wall papers, and this is particularly true of increasing numbers of amateurs and do-it-yourselfers, have been discouraged from doing so by apprehensions as to the difficulty of their removal when time or taste required it. The prospect of arduously steaming or soaking the covering for hours to loosen the grip of the adhesive holding it to the wall and then scraping it off in small shreds, because the wet covering cannot be made to tear from the wall in uniformly large strips or pieces, is hardly encouraging.

On the other hand, one applying a wallpaper which he is assured can be removed easily when the time therefor arises must also be assured that the means, e.g., the type of bond formed, which will make it possible will not also cause the covering to slide or sag on the wall prematurely; that is, before it has outlived its usefulness.

It is, then, a purpose of the present invention to provide a wall covering of paper, cloth, wood veneer, plastic or combinations thereof for use with conventional adhesives which can be stripped easily from the wall when for instance, a change of decor is desired, leaving a clean base for immediate application of new covering. Further, it is a purpose of this invention to provide a wall covering which, together with conventional adhesives, affords a cleaving bond between the covering and the wall having the characteristics of high shear and low tensile strength. The high shear of the cleaving bond keeps the covering in place and precludes side slippage thereof once the patterns of its several pieces have been satisfactorily registered. The low tensile strength of the cleaving bond facilitates ripping the covering cleanly from the wall when desired and with ease.

Accordingly, it has now been found that a wall covering having a decorative surface and a working surface and having a synthetic resin layer tightly bonded to the working surface can be readily peeled from a wall, leaving a clean base for reuse or re-covering, and that this wall covering is especially adapted for use in the method of forming the cleaving bond of high shear and low tensile strength of the present invention. Such synthetic resins can be polyethylene, vinyls, and nylons. Preferably, the synthetic resin is polyethylene having a density of about 0.942 to 0.965 and the layer is a film, coating, or extruder lamination of about 6 to 12 pounds polyethylene on 3000 square feet of the working surface and having a thickness of about 0.4 to 0.8 mil. Considering that polyethylene films in the higher density ranges exhibit tensile strengths of the order of 3000 p.s.i., together with an elongation factor of 600 to 700%, it is readily seen that the coating or extruder lamination on the wall covering working surface contributes greatly to its strength and, particularly, to its tear resistance. The tear resistance is increased 35% to 50%.

Originally, it was thought that the sequence of steps employed in the production of the wall covering of the invention, e.g., the time of the appplication of the synthetic resin to the working surface, was not material. Now, it has been found to be surprisingly significant, particularly where it is necessary to employ aqueous means, e.g., carriers or solvents, in the production of the decorative surface. For, in such cases, undesirable curls will arise in the wall covering if the synthetic resin is applied before the decorative surface has been completed. Such curls are toward the synthetic resin sealed working surface and exhibit the forces of expansion operating on the decorative surface and the forces resisting this expansion operating on the working surface. Thus, for example, it has been found that where a commercially available wall paper of the "Varlar" line has been given a decorative surface by a ground coating step using an aqueous slurry, a printing step using water-based printing medium and a vinyl coating step for the purpose of making the decorative surface washable, the application of the synthetic resin to the working surface of the paper after, rather than before, such steps obviates this need to "balance" by a complicated and expensive water hold-out coating applied to the decorative surface prior to its necessary contact with water and itself susceptible of giving rise to further problems of printing distortion and protective coating blistering, the stresses and strains placed upon wall paper stock. Again, it has been found that, where a commercially available wall paper has been given a decorative surface by a ground coating step using an aqueous slurry, a printing step using water-soluble or water-dispersible inks, dyes, or pigments, and a top coating step using a water-soluble protective agent which, when dry, permits a limited washing of the decorative surface, the application of medium to high density polyethylene to the working surface of the paper after the decorative surface has been prepared or finished, results in a superior wall covering and which either overcomes or avoids the above-noted problems of curling, ink shifting or drifting, blistering, etc. created by first applying the synthetic resin to the wall covering working surface and then giving the wall covering its decorative surface.

Further, it has been found that a wall covering having a decorative surface and a working surface and a polyethylene layer tightly bonded on one side to the working surface and matte finished on the other side is particularly easily peeled at a later date from a wall on which it is hung i.e., with a tensile force of about 1 to 5 pounds per lineal inch, and is particularly suitable for use in the method of forming the cleaving bond of the present invention. It is well known that polyethylene is inert to nearly all chemicals and solvents at ordinary temperatures. However, polyethylene film surfaces given matte finishes achieve compatibility with viscous pastes. Experiments have shown that when the surface of a polyethylene film is given a matte finish, as opposed to a high gloss, in the order of 120–250 lines or dots per inch during the extrusion-lamination process, the discontinuous surface thus obtained is compatible with the viscous water based pastes and adhesives usually used for the application of wall hangings, coverings, and the like.

Turning now to the adhesives useful in accordance with the present invention, it has been found that standard dry wheat paste, cellulose ethers such as carboxymethylcellulose (CMC), polyvinyl acetate chloride emulsions such as the commercially available "Arabol E 1773B," and the combination of these can be employed. A particularly good mixture includes 30% by weight of a polyvinyl acetate chloride emulsion adjusted to a solids content of approximately 50 to 65% and 70% by weight of carboxymethylcellulose solution containing 2 pounds of CMC per 100 pounds of water. Such adhesives do not penetrate the polyethylene film backing of the wall covering of the present invention, but they do achieve a cohesion with such film sufficient for all the purposes recited above.

For a further understanding of the invention, reference should be had to the following example:

*Example I*

A roll of #1 hanging stock wall paper, having a width of 72 inches, is run through a standard extruder-laminator at a rate of 1000 feet per minute. Polyethylene having a density of 0.960 is fed to the machine at a rate of 960 pounds per hour and is extruded upon the working surface of the wall paper at a pressure of 100 to 250 pounds per lineal inch of width to give a layer having a thickness of 5.5 mils. The chill roll of the laminating section has its surface etched or engraved in the order of 160 lines per inch to produce the desired matte or discontinuous surface on the polyethylene. As the coated wall paper leaves the extruder-laminator, it is slit and rewound for further processing and future use.

*Example II*

An 8 foot sample of the paper produced in Example I is coated on its polyethylene backing with an adhesive containing 1 part standard dry wheat paste by weight and 10 parts by weight water. The sample is then progressively applied to a clean section of a plaster wall, under a predetermined pressure suitably obtained by the flexing bristles of a paperhanger's brush and allowed to dry in place for 7 days. After this period, during which no vertical slippage of the sample is noted, it is removed by lifting a corner thereof from the wall and peeling the entire piece off. The exposed wall area resulting appears ready for re-covering without further treatment or cleaning.

*Example III*

An 8 foot sample of the paper produced in Example I is coated on this polyethylene backing with "Arabol E 1773B" adhesive, a commercially available polyvinyl type emulsion with a solids content of approximately 50 to 65%. The sample is then progressively applied to a clean section of hard wall, i.e., commercially available "Sheetrock" with a paperhanger's brush and allowed to dry in place for 7 days. After this period, during which no vertical slippage of the sample is noted, it is removed by lifting a corner thereof from the wall and peeling off the entire piece. The exposed wall area resulting appears ready for recovering without further treatment or cleaning.

*Example IV*

An 8 foot sample of the paper produced in Example I is coated on its polyethylene backing with an adhesive containing 2 parts by weight carboxymethylcellulose (CMC) and 100 parts by weight water. The sample is then progressively applied to a clean section of a plaster wall with a paperhanger's brush and allowed to dry in place for 7 days. After this period, during which no vertical slippage of the sample is noted, it is removed by lifting a corner thereof from the wall and peeling the entire piece off. The exposed wall area resulting appears ready for recovering without further treament or cleaning.

*Example V*

An 8 foot sample of the paper produced in Example I is coated on its polyethylene backing with an adhesive mixture containing 70 parts by weight of the polyvinyl type adhesive of Example III and 30 parts of carboxymethylcellulose solution containing 2 pounds of (CMC) per 100 pounds by weight of water. The sample is then progressively applied to a clean section of "Sheetrock" hard wall with a paperhanger's brush and allowed to dry in place for 7 days. After this period, during which no vertical slippage of the sample is noted, it is removed by lifting a corner thereof from the wall and peeling off the entire piece. The exposed wall area resulting appears ready for recovering without further treatment or cleaning.

*Example VI*

An 8 foot sample of the paper produced in Example I is coated on its polyethylene backing with an adhesive mixture containing 70 parts by weight of the polyvinyl type of adhesive of Example III and 30 parts of the wheat paste of Example II. The sample is then progressively applied to a clean section of plaster wall with a paperhanger's brush and allowed to dry in place for 7 days. After this period, during which no vertical slippage of the sample is noted, it is removed by lifting a corner thereof from the wall and peeling off the entire piece. The exposed wall area resulting appears ready for recovering without further treatment or cleaning.

*Example VII*

A sample of 50 lb. kraft paper (24 x 36–500) is subjected on one side to an extrusion of polyethylene of 0.960 density to a thickness of 5.5 mils. The adhesive of Example II is applied to the surface of the resulting polyethylene film and the sample is hung on a clean section of a plaster wall to dry in 7 days. After this period, during which no vertical slippage of the sample is noted, it is removed by lifting a corner thereof from the wall and peeling off the entire piece. The exposed wall area resulting appears ready for recovering without further treatment or cleaning.

*Example VIII*

A sample of 14 oz. hanging stock is coated on one side with polyethylene of 0.960 density to a thickness of 5.5 mils. The adhesive of Example III is applied to the surface of the resulting polyethylene film and the sample is progressively applied on a clean section of "Sheetrock" hard wall to dry in 7 days. After this period, during which no vertical slippage of the sample is noted, it is removed by lifting a corner thereof from the wall and peeling off the entire piece. The exposed wall area resulting appears ready for re-covering without further treatment or cleaning.

*Example IX*

A sample of 12 oz. hanging stock is given a lamination of polyethylene of 0.960 density and a thickness of 5.5 mils on one side. The adhesive of Example IV is applied to the surface of the resulting polyethylene film and the sample is placed on a clean section of a plaster wall to dry in 7 days. After this period, during which no vertical slippage is noted, it is removed by lifting a corner thereof from the wall and peeling off the entire piece. The exposed wall area resulting appears ready for re-covering without further treatment or cleaning.

*Example X*

A sample of 10 oz. hanging stock is given a lamination of polyethylene of 0.960 density and a thickness of 5.5 mils on one side. The adhesive of Example V is applied to the surface of the resulting polyethylene film and the sample is placed on a clean section of a plaster wall to dry in 7 days. After this period, during which no vertical slippage is noted, it is removed by lifting a corner thereof from the wall and peeling off the entire piece. The exposed wall area resulting appears ready for re-covering without further treatment or cleaning.

Example XI

A sample of 14 oz. hanging stock is given a lamination of polyethylene of 0.960 density and a thickness of 5.5 mils on one side. The adhesive of Example VI is applied to the surface of the resulting polyethylene film and the sample is placed on a clean section of a plywood wall to dry in 7 days. After this period, during which no vertical slippage is noted, it is removed by lifting a corner thereof from the wall and peeling off the entire piece. The exposed wall area resulting appears ready for re-covering without further treatment or cleaning.

What is claimed is:

1. In combination with at least one wall covering adhesive selected from the group consisting of wheat pastes, cellulose ethers, and polyvinyl acetate chloride emulsions, a strippable wall covering selected from the group consisting of paper, cloth, wood veneer, or combinations thereof and consisting essentially of a decorative surface, a working surface and a medium to high density polyethylene film layer on one side tightly bonded to the working surface and on the other side matte finished and in a cleaving bond of high shear and low tensile strength with the adhesive.

2. In combination with at least one wall covering adhesive selected from the group consisting of wheat pastes, cellulose ethers, and polyvinyl acetate chloride emulsions, a strippable wall covering selected from the group consisting of paper, cloth, wood veneer, and combinations thereof and consisting essentially of a decorative surface, a working surface, and a polyethylene film layer on one side tightly bonded to the working surface and on the other side matte finished and in a cleaving bond of high shear and low tensile strength with the adhesive, the polyethylene having a density of from about 0.942 to 0.965 and the layer having a thickness of from about 0.4 to 0.8 mil.

3. In combination with a wall, at least one wall covering adhesive selected from the group consisting of wheat pastes, cellulose ethers, and polyvinyl acetate chloride emulsions, a strippable wall covering selected from the group consisting of paper, cloth, wood veneer, and combinations thereof and consisting essentially of a decorative surface, a working surface and a medium to high density polyethylene film layer on one side tightly bonded to the working surface and on the other side matte finished and in a cleaving bond of high shear and low tensile strength with the adhesive.

4. In combination with a wall, at least one wall covering adhesive selected from the group consisting of wheat pastes, cellulose ethers, and polyvinyl acetate chloride emulsions, a strippable wall covering selected from the group consisting of paper, cloth, wood veneer, and combinations thereof and consisting essentially of a decorative surface, a working surface, and a polyethylene film layer on one side tightly bonded to the working surface and on the other side matte finished and in a cleaving bond of high shear and low tensile strength with the adhesive, the polyethylene having a density of from about 0.942 to 0.965 and the layer having a thickness of from about 0.4 to 0.8 mil.

References Cited by the Examiner

UNITED STATES PATENTS

| | | | |
|---|---|---|---|
| 2,147,817 | 2/39 | Johnson | 156—71 |
| 2,608,504 | 8/52 | Meyer et al. | 156—71 |
| 3,042,563 | 7/62 | Shearer et al. | 161—413 |

FOREIGN PATENTS 601,713   5/48   Great Britain.

OTHER REFERENCES

App, E. A.: Printing Ink Technology, London, L. H. Brooks, Ltd., 158, TP 949 A6 (p. 431).

JACOB H. STEINBERG, *Primary Examiner.*

CARL F. KRAFFT, EARL M. BERGERT, ALEXANDER WYMAN, *Examiners.*